Sept. 27, 1927. 1,643,684
M. SOENENS
MACHINE FOR HARVESTING FLAX AND OTHER PLANTS
Filed July 14, 1925  3 Sheets-Sheet 3
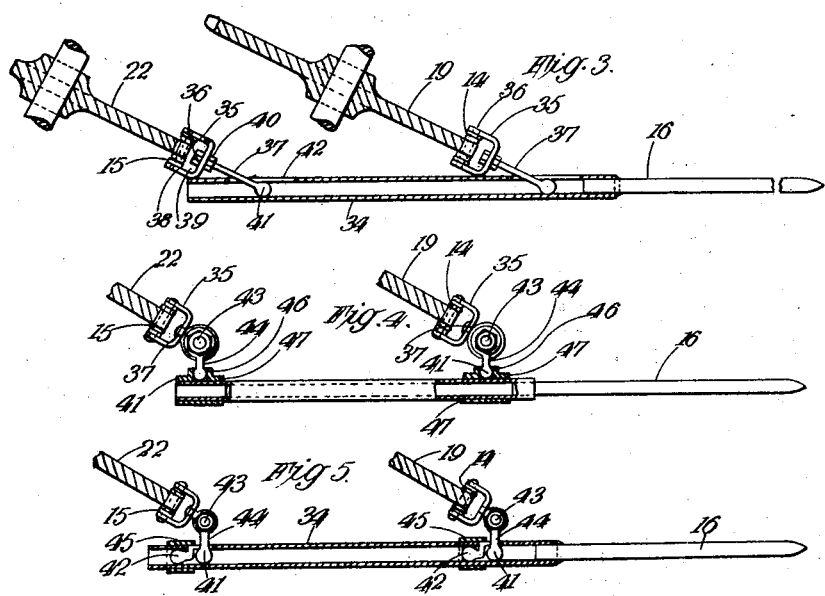

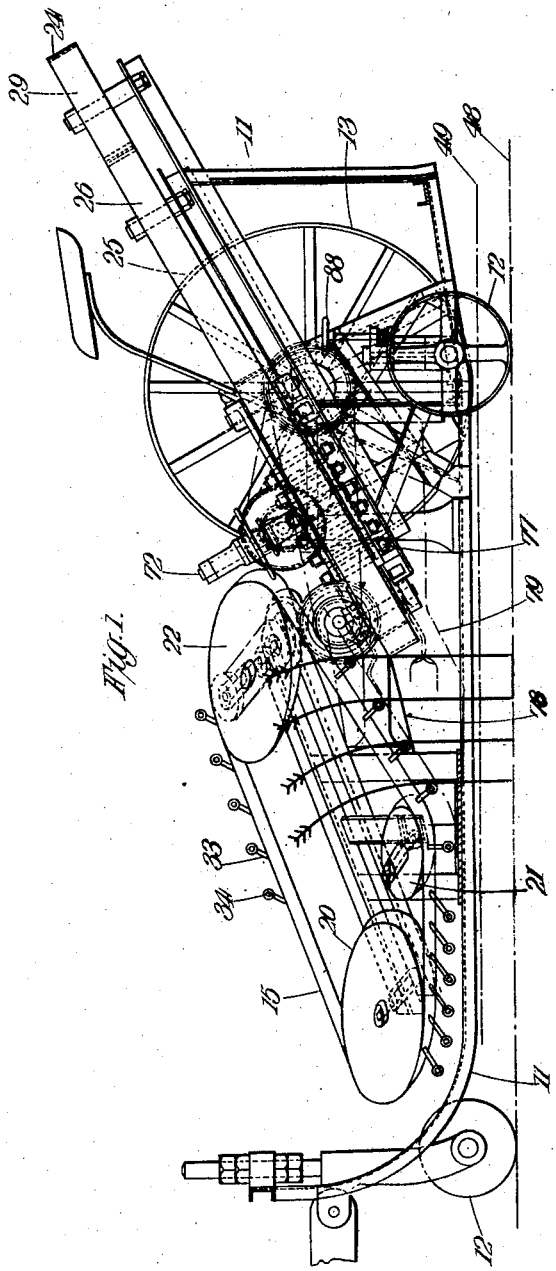

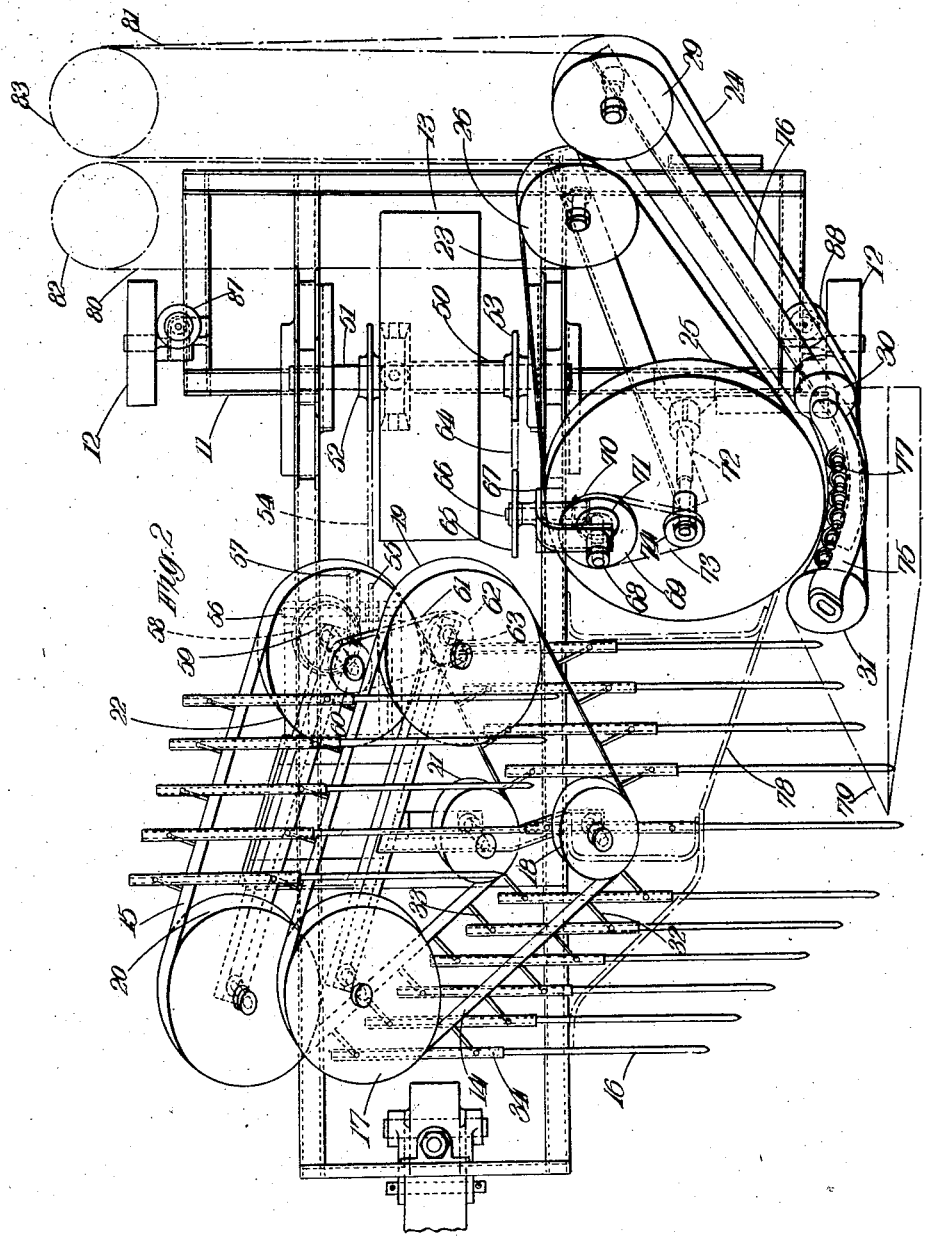

Patented Sept. 27, 1927.

1,643,684

UNITED STATES PATENT OFFICE.

MAURICE SOENENS, OF BURY ST. EDMUNDS, ENGLAND, ASSIGNOR TO ROBERT BOBY LIMITED, OF ST. ANDREWS IRONWORKS, BURY ST. EDMUNDS, ENGLAND.

MACHINE FOR HARVESTING FLAX AND OTHER PLANTS.

Application filed July 14, 1925, Serial No. 43,435, and in Great Britain February 3, 1925.

This invention relates to machines for harvesting flax and other plants, such machines being of the kind in which combs or erecting needles are caused to enter laterally between the stalks of the standing crop and rise so as to lift any stalks which may have been laid or bowed by storms or from other causes, a series of the said needles travelling on flexible carrying means such as belts or chains passing around pulleys or sprocket wheels and being consecutively protruded at the side of the travelling machine, the belts or chains carrying the erecting needles being positioned and caused to travel obliquely in relation to the direction of the advance of the machine, so that the gradual penetration of each of the said needles between the stalks of the crop is effected by the travel of the said belts or chains. The operative part of the belt or chain comprises an inclined portion travelling in a direction nearly opposite to that of the advance of the machine and at such a speed that the advance of the machine counteracts the longitudinal component of the movement of the said inclined portion, so that each erecting needle penetrates laterally between the stalks and moves upwardly in contact therewith.

According to this invention three pairs of pulleys are arranged in two superposed triangles, the plane of each triangle being tilted or inclined in a direction transverse to that of the advance of the machine, and two parallel chains carrying lifting needles pass around these pulleys. From the needles the stalks are guided to inclined pulling belts, one of which belts may be supported and guided by rollers.

In order that the said invention may be clearly understood and readily carried into effect, the same will now be described more fully with reference to the accompanying drawings, in which:—

Figure 1 is a side elevation of a machine illustrating an embodiment of the invention, one of the needle-carrying chains being omitted for the sake of clearness.

Figure 2 is a plan of the machine illustrated in Figure 1.

Figures 3, 4 and 5 represent three examples of means for connecting the needles with the chains or belts of the lifting device illustrated in Figures 1 and 2.

Referring firstly to Figures 1 and 2, the framework of the travelling machine is indicated at 11, this framework being provided with road wheels 12, 13, from the latter of which the erecting and pulling mechanism are driven by suitable gearing. The erecting mechanism comprises a pair of parallel chains 14, 15, carrying needles or lifting rods 16; one of these chains, 14, passes around three pulleys or sprocket wheels 17, 18, 19 and the other of the said chains 15 similarly passes around three pulleys or sprocket wheels 20, 21, and 22 in plane parallel to that of chain 14, the path of each chain being located in an inclined plane oblique in relation to the direction of the advance of the machine; each of the needles or lifting rods 16 is secured to both chains, so that in its operative movement, that is, while it is being carried on the chains from the pulleys 17 and 20 to the pulleys 18 and 21 horizontally, and then rising from the pulleys 18 and 21 to the pulleys 19 and 22, it is gradually protruded beyond the side of the machine. At the pulleys 19 and 22 the needles leave the stalks which they have erected, and return inoperatively to the pulleys 17 and 20, while the said stalks are gripped and drawn into the machine between two endless travelling belts 23 and 24, and thereby uprooted. The belt 23 passes around the large disc or pulley 25 and the smaller pulley 26, while the belt 24 passes around the pulley 29, at which latter it releases the pulled stalks, and returns by way of the pulleys 30 and 31 to the pulley 29. Outside each chain a series of links 32, 33 project at right angles to the path of the chain. A tubular or other rod or extension 34 on the rear of each erecting needle 16 is connected by universal joints with two links 32, 33 on different chains, so that each needle 16 is kept in a horizontal position at right angles to the direction of the advance of the machine throughout its travel. The plane of that portion of the travel of the chains 14 and 15 in which the needles 16 are gradually protruded, that is, from the pulleys 17 and 20 to the pulleys 18 and 21, is horizontal, the needles 16 reaching their position of extreme protrusion as they pass around the salient pulleys 18 and 21; the chains then move in planes that rise and recede, withdrawing the needles 16, and the return travel of the chains and needles begins at a higher position, descending from the pulleys 19 and 22 to the pulleys 17 and 20, at which latter position the needles again come into action horizontally.

Each of the above named universal joints may comprise a staple 35 hinged at 36 to the chain and a straight arm 37 (Figure 5) passing through a hole in the staple 35 and having a screw threaded end 38 on which nuts 39 and 40 can be adjusted to regulate the effective length of the said arm, the arm 37 terminating in a ball 41 which enters a slot 42 in the extension 34 of the needle 16. Alternatively the arm 37 may be jointed at 43 (Figures 4 and 5), its outer part 44 being either straight as in Figure 4, or cranked so that its ball 41 can enter a slot 42 of appropriate shape in the extension of the needle 16, as in Figure 5. In the latter modification, after the insertion of the ball 41 the cranked portion of the arm is turned through a quarter of a revolution before being connected with the staple 35 and a collar or short tube 45 is moved along the extension 34 to hold the said cranked portion away from the slot 42 and thereby to prevent its accidental disengagement. The ball 41 may alternatively be housed in an enlarged portion 46 of a collar 47 adapted to slide on the extension 34.

The framework 11 is adapted to be raised and lowered in relation to the road wheels 12 by suitable gearing, which may for example be operated by hand wheels such as 87 and 88 (Figures 1 and 2). The line 48 in Figure 1 indicates the ground level, the machine being illustrated in its raised position, that is, in condition for transportation, while the line 49 indicates the distance of the ground from the framework 11 when the operative parts of the machine have been lowered ready for pulling the crop, the driving wheel 13 for transmitting power to the lifting and pulling devices being in such lowered position in contact with the ground, whereby it is rotated as the machine travels. In this example a sleeve or boss 50 turning with the wheel 13 and loose on the shaft 51 (Figure 2) carries chain wheels or pulleys 52 and 53, for driving respectively the lifting needle chains and the pulling belts. From the former wheel 52 a chain 54 transmits motion by way of the wheel 55 to a short stud 56 in the machine frame, on which stud 56 is a bevel pinion 57 in mesh with another bevel pinion 58 on another short stud 59 carrying the chain pulley 22 and on the latter stud 59 is a pulley 60, which by means of a chain 61 and pulley 62 drives the stud 63 of the pulley 19. The pulleys 17, 18, 20, and 21 are carrier pulleys driven by the friction of the chains 14 and 15. A wheel 65 on a stud 66 carried on a bracket 67 on the machine frame is driven by a chain 64. The bracket 67 also carries a stud 68 on which is mounted a chain wheel 69, the stud 68 being driven by bevel gearing 70, 71, from the stud 66, and the large pulley 25, mounted on a stud 72 in the machine frame, is driven from the chain wheel 69 by a chain 73 and pulley 74. The pulley 26 is driven by the pulling belt 23, and the counter pulling belt 24 passing around the pulleys 29, 30 and 31 is caused to travel by the friction of the said belt 23. A casing 75 carried on an angle bracket 76 supports the pulleys 30 and 31 and in the said casing 75 between these pulleys may be mounted a series of pressing rollers 77 which maintain a constant pressure between the belts 24 and 23 during the pulling operation. These rollers will only be required when harvesting crops growing in hard ground. The stalks are guided to the pulling belts by guides or jaws 78 and 79, and leave the said belts when the belts diverge at the pulleys 26 and 29. An auxiliary conveyor may be provided at the rear of the machine, as illustrated diagrammatically in Figure 4, where the auxiliary conveyor comprises belts 80 and 81 passing around pulleys 82 and 83 and around any conveniently arranged pulleys at the gathering side of the machine, for example on the studs of the pulleys 26 and 29, or if desired the belt 81 may be an extension of the pulling belt 24 beyond the pulley 29. The belt 80 can be driven in any convenient manner. The pulleys 82 and 83 are preferably so arranged that they can be moved up or down and swung either towards the front of the machine or away from the back of the machine according to requirements for spreading the pulled stalks on the ground as the machine advances.

What I claim and desire to secure by Letters Patent of the United States is:—

1. In a machine for uprooting flax and other plants, the combination of means for erecting the stalks of the crop and guiding them to pulling devices, said means comprising two sets of pulleys arranged in two parallel triangles, the plane of each triangle being tilted transversely in relation to the direction of advance of the machine; two parallel flexible conveyors each adapted to travel over one of said sets of pulleys; and a series of rigid needles each secured to both the said flexible conveyors, whereby each of the said needles is maintained in a substantially horizontal position throughout said travel, and is in turn protruded laterally from the side of the machine to enter between the stalks of the crop and retracted while rising in contact with said stalks.

2. A machine as in claim 1 wherein each erecting needle is connected by universal joints with two links on different conveyor chains, so that each needle is kept in a horizontal position at right angles to the direction of advance of the machine throughout its travel.

3. A machine as in claim 1 wherein each erecting needle is connected with both conveyors by two links at different points in the length of the needle, each of said links comprising a staple pivotally connected with the conveyor and a ball joint connecting said staple with the needle.

4. A machine as in claim 1 wherein each erecting needle is connected with both conveyors by two links at different points in the length of the needle, each of said links comprising a staple pivotally connected with the conveyor, an arm adjustably connected with said staple and adapted to swivel therein, and a ball on said arm entering a recess in the shank of the needle.

5. A machine as in claim 1 wherein each erecting needle is connected with both conveyors by two links at different points in the length of the needle, each of said links comprising a staple pivotally connected with the conveyor, an arm adapted to swivel in said staple, and a ball on said arm entering a recess in the shank of the needle, said arm being jointed at a position between said ball and said staple.

MAURICE SOENENS.